(12) United States Patent
Selvidge (10) Patent No.: US 7,964,000 B2
(45) Date of Patent: Jun. 21, 2011

(54) BIODIESEL FUEL BLEND

(75) Inventor: Charles Selvidge, Wichita, KS (US)

(73) Assignee: Flint Hills Resources, L.P., Wichita, KS (US)

( * ) Notice: Subject to any disclaimer, the term of this patent is extended or adjusted under 35 U.S.C. 154(b) by 498 days.

(21) Appl. No.: 11/674,887

(22) Filed: Feb. 14, 2007

(65) Prior Publication Data

US 2008/0127552 A1   Jun. 5, 2008

Related U.S. Application Data

(63) Continuation-in-part of application No. 11/607,642, filed on Nov. 30, 2006, now abandoned.

(51) Int. Cl.
*C10L 1/18* (2006.01)
(52) U.S. Cl. .......................................... 44/308; 44/388
(58) Field of Classification Search .................. 44/307, 44/308, 388
See application file for complete search history.

(56) References Cited

U.S. PATENT DOCUMENTS

| | | | |
|---|---|---|---|
| 5,520,708 A * | 5/1996 | Johnson et al. ................ 44/388 |
| 6,015,440 A | 1/2000 | Noureddini | |
| 6,174,501 B1 | 1/2001 | Noureddini | |
| 6,719,815 B2 | 4/2004 | Nanninga et al. | |
| 7,112,229 B2 | 9/2006 | Khalil et al. | |
| 2007/0283619 A1 | 12/2007 | Hillion et al. | |
| 2008/0005957 A1 | 1/2008 | Sell et al. | |

OTHER PUBLICATIONS

National Biodiesel Board Fuel Quality Policy, pp. 1-2, Jun. 21, 2006.
Engine Manufacturers Association, "Test Specifications for Biodiesel Fuel", pp. 1-6, May 31, 2006.

* cited by examiner

*Primary Examiner* — Cephia D Toomer
(74) *Attorney, Agent, or Firm* — Vinson & Elkins LLP (57) ABSTRACT

Biodiesel fuel blends with improved low temperature filterability include a biodiesel source with reduced glycerin contaminants, and reduced monopalmitin and monostearin contaminants, or with cold filter characteristics equivalent with the base diesel.

35 Claims, 10 Drawing Sheets

BIODIESEL FUEL BLEND

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

Biodiesel fuels are methyl esters or ethyl esters of long chain fatty acids derived from renewable, primarily agricultural sources, such as vegetable oils or animal fats for use in diesel engines. Biodiesel is produced in a pure form (100% biodiesel fuel is referred to as "B100" or "neat biodiesel") and may be blended with petroleum-based diesel fuel. Biodiesel blends are denoted as "BXX," with "XX" representing the percentage of biodiesel contained in the blend (i.e.: B20 is 20% biodiesel, 80% petroleum diesel, B2 is 2% biodiesel, 98% petroleum diesel and B5 is 5% biodiesel, 95% petroleum diesel. Several standard-setting organizations worldwide have adopted biodiesel specifications. ASTM International has approved a specification for biodiesel referenced as D 6751. As used herein, and as accepted in the art, the D numbers refer to ASTM Standards; ASTM, 100 Barr Harbor Drive, West Conshohocken, Pa. 19428-2959. In addition, German authorities have issued a provisional specification for fatty acid methyl esters under DIN 51606. Europe's Committee for Standardization ("CEN") is setting a technical standard for biofuels to be referred to as EN 14214. According to the Engine Manufacturer's Association (EMA), depending on the biomass feedstock and the process used to produce the fuel, B100 fuels should meet the requirements of either ASTM D 6751 or an approved European specification, such as DIN 51606 or EN 14214 (once adopted). These standard setting bodies, therefore, are considered by the industry to represent the current best knowledge in the art.

One issue that arises with the use of biodiesel blends is the cold weather performance of the blends. The EMA has issued a statement regarding premium diesel fuel. This Consensus Position is intended to define premium diesel fuel marketed commercially at retail fueling stations and truck stops. The Consensus Position states that it is the belief of the EMA and The Maintenance Council (TMC) that equipment users look to premium diesel fuel at the pump as a significant opportunity for improving fuel-related performance issues or solving problems related to fuel. Among the most significant aspects of this recommendation was a reference to improved cold weather performance. Regarding cold weather performance, the statement includes a discussion of several tests that are said to be commonly used to characterize the low temperature operability of diesel fuel. These are Cloud Point, Low Temperature Flow Test (LTFT), and Cold Filter Plugging Point (CFPP). Among these, the paper indicates that LTFT provides the best overall correlation with field performance, and that, for non-additized fuel, Cloud Point and LTFT correlate very well. Since Cloud Point is more practical as a quality control test, it is listed as the primary recommendation.

Another organization that is recognized in the field as representing the current state of knowledge in the art is the National Biodiesel Board (NBB). The NBB describes itself as "the national trade association representing the biodiesel industry as the coordinating body for research and development in the United States." In a white paper published online by the NBB entitled Cold Flow Impacts, the cold flow properties of biodiesel are discussed. The paper states that "During the last seven years, the cold flow properties of biodiesel and biodiesel blends have been thoroughly tested with a variety of diesel fuels, both with and without cold flow enhancing additives. Biodiesel blends (primarily B20) have also been used in a variety of climates—including some of the coldest weather on record—without cold flow problems."

This paper concludes with several statements summarizing the NBB's position on the current thinking in the use of biodiesel in cold weather. These conclusions include the following statements.

(1) Number 2 diesel fuel can experience significant cold flow problems in cold weather.

(2) The diesel industry have met the challenge associated with Number 2 diesel through a variety of means that are in common practice today, i.e., kerosene and cold flow additives.

(3) These same solutions should be used with biodiesel blends to assure satisfactory cold weather performance, focus on the conventional fuel depressing the cold flow values as deep as possible with kerosene and additives while starting with a base fuel that possesses low cloud and cold filter plugging point values.

(4) Incorporation of blends with less than 20% biodiesel (i.e. B5 or B2) into existing diesel fuel has demonstrated little or no negative effect on the cold flow properties of the finished blend, however, it is very important to ensure observation of cold flow properties of base fuels and ensure proper blending principals of diesel and biodiesel.

The State of Minnesota began requiring the use of at least 2% biodiesel in biodiesel blends in the state as of September 2005. In the fall following the mandate there were no reports of filter plugging, but some anecdotal evidence of certain fleets experiencing an increase in filter changes. December of 2005, however, brought the first period of temperature below 0° F. and during this cold weather there were numerous reports of filter plugging with B2 blends in all areas with all brands of diesel fuel. In many cases a creamy, paste-like material was reported.

In response to this plugging problem, the NBB initiated a new investigation that resulted in a "Draft" new cold soak filter time test for biodiesel. The Draft NBB filtration time test is performed essentially as follows:

The original sample container is well mixed;

A subsample is taken immediately after mixing;

The subsample is chilled at 40° F. for 16 hours and allowed to warm to room temperature without heating;

The subsample is then shaken for 1 minute and a 300 ml portion of the subsample is immediately measured into a 500 ml graduated cylinder and transferred to a filter funnel;

The filter is a 1.6 micron glass fiber filter (Whatman GF/A)

Filtration is under a vacuum of 21 to 25 inches Hg;

The filtration time for the full 300 ml is measured, and a time of 360 seconds is considered acceptable for use in biodiesel blends, at least up to B20.

For the B100 filtration time tests presented in the present disclosure, the filter was supported on a stainless steel mesh that contributed negligible resistance to flow, in contrast to the draft NBB method that uses a glass frit support. An aspect of the present disclosure, however, is that this draft test is inadequate for prediction of cold flow problems.

The present disclosure addresses a problem that is unrecognized by the standard setting and trade association bodies that represent the current state of the art of the manufacture and use of biodiesel products, and especially biodiesel products for use in compression ignition engines in cold weather conditions. The disclosure also demonstrates that the accepted tests for cold temperature performance are inadequate to detect the cold weather problems and provides improved fuels that overcome these cold weather issues.

SUMMARY

The present disclosure is based on the surprising discovery of an improved biodiesel blend that achieves filterability characteristics that can be comparable to those of the base diesel in the blend, thus improving cold weather operations and resulting in better engine performance and fewer maintenance requirements. When testing biodiesel products with a cold soak temperature filter time test similar to the method drafted by the NBB and described herein, the present inventor discovered that essentially pure soy biodiesel (<0.03 wt % total glycerin) has a low filtration time of approximately 15 seconds through a single 1.6 micron glass filter after being chilled to 40° F. and allowed to warm to room temperature without heating. Using this test, the inventor further discovered that filtration time of B100 increases with increases in total glycerin and monoglyceride impurities, such that B100 with 0.20% total glycerin had filtration time greater than 200 seconds, B100 with 0.29% total glycerin had a filtration time of 340 seconds, and recently available improved B100 achieves filtration times near 20 seconds even with 0.15 wt % total glycerin.

It is a further discovery of the present inventor that, contrary to what is taught by the industry based on the current standards, impurities in B100 have a significant effect on the filtration characteristics of a B2.5 blend when compared to the B0 component. For rapid cooling (less than 1 hour) with coarse filter (45 microns) e.g., CFPP, B100 impurities within the total glycerin range accepted by ASTM 6751 (0.240%) do not affect the CFPP temperature. However CFPP has not been validated for biodiesel blends using actual vehicle low temperature operability studies. The data presented herein demonstrate that the current ASTM Total Glycerin (TG) limit of 0.240% and the modified Draft proposed NBB filtration time limit of 360 seconds (with one filter) are not protective for low temperature operability because they can accept sufficient impurities in B100 to substantially compromise the LTFT and the Navy rig test performance of resulting B2.5 blends.

A more effective field simulation test for cold weather performance is the LTFT, with "slow cooling" (>16 hours) and fine filters (17 microns). As disclosed herein, B100 impurities substantially elevate the LTFT temperature of B2.5 relative to the corresponding B0 even with total glycerin levels of 0.20%, which is below the current ASTM specification (0.240%) and at B100 filtration times of 215 seconds (using the filtration time method described herein), a characteristic that is also well below the current "Draft" proposed NBB limit for B100 filtration times (360 seconds). The substantial elevation of LTFT for B2.5 vs. B0 when using biodiesel with filtration times of about 200 seconds (by the methods described herein) is observed for all state of the art cold flow improvers that have been tested in LTFT testing. In these studies B2.5 made with biodiesel containing 0.20 wt % total glycerin could not achieve LTFT performance significantly lower than the Cloud Point. This indicates that B5 blends cannot achieve ASTM low temperature operability limits for Minnesota, even when using No. 1 diesel as the base blend stock. As shown herein, however, even when using the more effective LTFT, essentially pure soy biodiesel does not have a significant effect on the filtration properties of B2.5 blends versus B0. The present disclosure is thus able to provide biodiesel fuel blends that overcome the problems of the conventional biodiesel blend fuels, by using B100 sources that have a filtration time in the modified "Draft" NBB test of less than 200 seconds, or less than 100 seconds, or less than 50 seconds, or even less than 20-30 seconds. It is contemplated that biodiesel with NBB filtration times in excess of 20-30 seconds may have impurities with high melting points and these could be difficult to redissolve in the diesel fuel system fuel recirculation system that is the basis for predicting operability below the Cloud Point for the LTFT and CFPP tests.

It is a further discovery of the present inventor that impurities that are especially problematic are the monoglycerides of saturated fatty acids (specifically monopalmitin and monostearin). These impurities are present in the biodiesel that is produced from essentially all biodiesel feedstocks. Some feedstocks produce more of these than others and some processes allow more of these than others to appear in the product biodiesel. The current state of the art biodiesel specification does not limit these impurities. For example, no mention of these impurities is contained in any quality guidance of the NBB, arguably the most expert organization concerning biodiesel quality.

As disclosed herein, certain soy biodiesel products, when allowed to sit for many hours at 40° F. develop a white precipitate, even when the product meets all of the specifications of ASTM D 6751, and has a Cloud Point of 32° F. or some other temperature below 40° F. The precipitate that forms from this biodiesel after sitting at 40° F. for extended periods of time has been found to be rich in monopalmitin and monostearin. These compounds thus phase separate into a separate phase that is highly enriched in these compounds when held for periods of many hours at 40° F. or other temperature even above the measured Cloud Point. For example, the starting biodiesel typically contains about 0.063 and 0.02 wt % of these two compounds, respectively. The separated phase, however, was shown to contain 9% and 6%. The separated phase is thus concentrated more than 100 fold versus the total in the starting biodiesel.

Further discoveries disclosed herein include that diesel fuel blends that contain about 2% of biodiesel typically have a Cloud Point that is elevated by a few degrees F. versus the corresponding B0, and furthermore, B2 diesel fuel blends made with biodiesel that undergoes the phase separation characteristics described above have surprisingly poor performance in a dispenser filter that continuously filters such B2 product. It has been found that a dispenser filter operation with such product gives an unacceptable filtration life especially when temperatures drop to low levels such as below 5° F., below 0° F., or lower when using a base diesel fuel with a low Cloud Point such as below −10° F. Experience shows, for example, that such a dispenser filter has long periods of service with many months including periods of operation below 0° F. when using the base diesel, B0, with no biodiesel. When this Cloud Point controlled base diesel fuel is combined with biodiesel that exhibits the cold soak behavior described above (namely phase separation when held at temperatures above the Cloud Point) such filters can reach excessive pressure drop in hours or days versus months. Furthermore, when the dispenser filters that are removed from such service are investigated, it is discovered that these filters contain greatly elevated concentrations of monopalmitin and monostearin. It is an aspect of the present disclosure, therefore, that providing a starting biodiesel (B100) with low concentrations of monopalmitin and monostearin produces biodiesel blends that avoid the problems of unacceptably low filter lives, especially when used at low temperatures.

The present disclosure may be described in certain embodiments, therefore, as a composition comprising a mixture of a B0 base diesel fuel and a B100 biodiesel fuel, wherein the B100 biodiesel fuel contains less than 0.240 wt. % total glycerin, or from about 0.20 wt. % to 0.01 wt. %, about 0.15 wt. % to 0.01 wt. %, about 0.10 wt. % to 0.01 wt. %, about 0.05 wt. % to 0.01 wt. %, or about 0.03 wt. % total glycerin. The compositions may also include a blend in a ratio of from 50% to 2% biodiesel to diesel, or a B50, B20, B5, B2.5, or B2 biodiesel blend. The base diesel is preferably an approved diesel fuel or even a high performance fuel, and in certain embodiments meets the specifications for ASTM Grade No. 2 diesel fuel, or ASTM Grade No. 1 diesel fuel. The base diesel fuel may include a cold flow improver, and may have a cloud point below 0° F., or about −7 F, or about −14° F., about −17° F. or even about −20° F. or lower.

Certain embodiments of the disclosure may also be described as compositions including a mixture of a B0 base diesel fuel and a B100 biodiesel fuel, wherein the B100 biodiesel fuel has a filtration time of less than 360 seconds when filtered through a single 1.6 micron glass filter under a vacuum of from 21 to 25 inches Hg, in a procedure in which a sample of the B100 is chilled at 40° C. for 16 hours and allowed to warm to room temperature without heating; the sample is shaken for one minute; a 300 ml subsample of the B100 sample is transferred to the filter; and filtration time for the 300 ml subsample is measured. In certain embodiments the B100 will have a filtration time of less than 100 seconds, less than 20 seconds, or the B100 may have a filtration time that is substantially equivalent to the filtration time of the B0 diesel used in the blend. The composition may be a blend of from 50% to 2% biodiesel and may be a B50, B20, B5, B2.5, or B2 biodiesel blend.

The disclosure can be defined in certain embodiments, furthermore, as a composition consisting of a biodiesel fuel blend that contains extraordinarily low levels of monopalmitin and monostearin. These levels are much lower than the state of the art as represented by the current biodiesel specification D 6751, which does not address these problematic components. In addition, therefore to limiting the total glycerin content to 0.240 wt %, as disclosed herein, it is a further characteristic of the claimed fuels that they contain low levels of monopalmitin and monostearin to produce blends of biodiesel and diesel fuel that are fit for purpose. A quality measure for biodiesel that is more fit for purpose is for the biodiesel when cooled to 40° F. for several days to exhibit minimal phase separation. Biodiesel that meets the current ASTM D 6751 specification can still give significant precipitate when held for several days at 40° F. Such product is not fit for purpose as shown by the testing described above. The monopalmitin and monostearin levels can be affected by controlling the levels for total glycerin. They can also be controlled by limiting the levels of monoglycerides. The present disclosure includes limiting the monoglyceride level to less than 0.40 wt % and preferably to levels of 0.20 wt % and less and/or to limiting the levels of monopalmitin and monostearin. The monopalmitin and monostearin in the disclosed compositions are present in concentrations of less than 0.04 and 0.015 wt % respectively, or even 0.02 and 0.01 wt %.

Certain embodiments of the disclosure may also be described as methods of producing a biodiesel blend for use in cold weather conditions comprising blending a B0 diesel fuel with a B100 biodiesel, wherein the lowest pass temperature in an LTFT test for the blend is substantially the same as the lowest pass temperature for the B0. The blend may be any blend of 50% biodiesel or less, and includes B20, B5, B2.5, and B2 blends.

The LTFT test as described herein is ASTM D 4539 "Test Method for Filterability of Diesel Fuels by Low-Temperature Flow Test" (LTFT) and is used to estimate the lowest operating temperature for a diesel fuel. The test consists of several 300 ml sample containers that are immersed in a temperature controlled bath. The sample containers have an outlet line that opens near the bottom of the container and that is fitted with a nominal 17 micron filter. The sample outlet line is connected to a receiving flask that is attached to a vacuum line. At a test temperature the nominal 200 mL of sample is sucked from the sample container for 60 seconds or until suction is lost if before 60 seconds. If suction is lost in 60 seconds the sample is considered to pass at that temperature. If the sample passes another sample is cooled to a lower temperature at 1 degree C. per hour and retested. This testing mode continues to produce a lowest pass temperature and a highest fail temperature. The lowest pass temperatures are reported in the attached drawings.

The total glycerin values reported herein are determined by ASTM D 6584, "Determination of Free and Total Glycerin in B100Biodiesel Methyl Esters by Gas Chromatography." This is a gas chromatography (GC) test method that is conducted on the biodiesel material after it has been silylated with N-methyl-N-trimethylsilyltrifluoracetamide (MSTFA). Calibration is achieved by use of two internal standards and four reference materials.

The Cold Filter Plugging Point (CFPP) test, ASTM 6371, is widely used to predict the low temperature performance of diesel fuel and biodiesel blends. In the CFPP test protocol a diesel fuel sample is cooled in a bath to a low temperature. At the test temperature, suction, via small vacuum is pulled on the sample and it is sucked through a filter at the test temperature. The sample achieves a CFPP test pass if 60 ml are sucked through the filter in 60 seconds. The fill time is an indication of flow rate through the filter. Alternatively, a pressure difference across the filter is used to indicate filter plugging.

The Navy rig test as used herein refers to ASTM D 2068 "Standard Test Method for Filter Plugging Tendency of Distillate Fuel Oils." This test evaluates filter plugging tendency of fuels by conducting constant flow rate filtration using a 1.6 micron filter with attendant measurement of required pressure drop. Increases in pressure drop indicate filter plugging tendency.

Throughout this disclosure, unless the context dictates otherwise, the word "comprise" or variations such as "comprises" or "comprising," is understood to mean "includes, but is not limited to" such that other elements that are not explicitly mentioned may also be included. Further, unless the context dictates otherwise, use of the term "a" may mean a singular object or element, or it may mean a plurality, or one or more of such objects or elements.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

The present disclosure arises from the discovery of a system for producing biodiesel blends that have improved filtration properties, and that provide a significant advantage over conventional biodiesel fuel blends when used in cold weather situations. The methods and compositions of the disclosure address a previously unrecognized problem with biodiesel blends that meet all the recommended standards of the ASTM and National Biodiesel Board. The improved filtration properties are achieved by using biodiesel B100 sources with properties that provide the blend with filtration properties that are essentially the same as the base diesel fuel, B0. Two important tests for filtration characteristics are the LTFT test, D 4539, and the ASTM D 2068 test, called the Navy rig test. The LTFT test is especially important for operation at low temperatures and especially for temperatures near 90% winter minimums for such states as Minnesota. The present inventor has discovered that when B2.5 blends are prepared with B100 having varying levels of impurities as indicated by the value of the total glycerin measurement or increased levels of impurities as indicated by increased values for the modified "Draft" NBB filtration time test, the LTFT values and the D 2068, Navy rig test, wherein an increased level of impurities compromises the pressure drop performances of the fuel. As used in this context, total glycerin includes monoglycerides, diglycerides and triglycerides as measured in D 6584. For example, as described herein, any values of impurities lower than 0.240 wt. %, such as from about 0.23% to about 0.002% inclusive, all below the ASTM limit of 0.240 wt % total glycerin will improve the filtration performance in LTFT and the D 2068 tests. Likewise any biodiesel with impurity levels lowered so the modified "Draft" NBB filtration time is lower than the 360 second limit recommended by NBB for biodiesel will improve the filtration performance in LTFT and D 2068 tests. It is a further discovery described in the present disclosure that the use of B100 with improved filterability characteristics has a significant effect on the filtration characteristics of biodiesel fuel blends produced with that B100 even at levels as low as B2.5 or B2.0.

The present disclosure addresses a previously unrecognized need in the industry, evidenced by the fact that prior to the present disclosure, the NBB, the national trade association representing the biodiesel industry as the coordinating body for research and development in the United States, has not disclosed the importance of closely controlling impurity levels of biodiesel, B100, to levels lower than the ASTM D 6751 specification for improved filtration properties of biodiesel blends, BXX. For example, as of the filing date of the present disclosure, the NBB website and national meetings report that "cleaning the system" on transition to biodiesel blends may cause filtration problems with plugging of filters. More recently the NBB has reported that biodiesel with impurities levels that are greater than the values of 0.240 wt % for total glycerin as required by the ASTM biodiesel specification D 6751 may cause problems with filter plugging when used to make BXX blends. However the NBB has not reported that the use of much lower total glycerin values than the level of 0.240 wt % are important to prevent the biodiesel from compromising the LTFT performance of the base biodiesel or achieving no harmful effects on the filtration performance of the base diesel into which it is added. Neither does the industry recognize the importance of the monoglycerine levels, and in particular, the importance of monostearin and monopalmitin. The results presented herein are also surprising because test results with the CFPP test, the low temperature performance test referenced by the NBB show that the CFPP performance is not responsive to impurities in the region below a total glycerin level of 0.240 wt %. The ASTM has judged the LTFT to be a superior predictor of low temperature performance than the CFPP test.

The present disclosure thus provides compositions and methods that are not only surprising but very important commercially because they overcome a previously undisclosed performance deficiency in fuel that meets the standards now published by the National Biodiesel Board, i.e. ASTM D6751 and BQ9000. As shown herein, in contrast to the accepted standard of 0.240% total glycerin, the present disclosure indicates that biodiesel that contains less than 0.15 wt % total glycerin has a minimal effect on the LTFT performance of the base diesel fuel into which it is added and a small effect on pressure drop elevation relative to the corresponding B0 in the D 2068 test. As part of the present disclosure, the present inventor has discovered that biodiesel with impurity levels so low that the NBB filtration time test has a filtration time of less than 100 seconds using one filter has a small effect on the LTFT and D 2068 performance. Furthermore, biodiesel that contains less than 0.03 wt % total glycerin has an insignificant effect on elevation of the LTFT versus the base diesel fuel and an insignificant effect on the pressure drop versus the base diesel fuel as measured by the ASTM D2068 test. The ability to produce B2.5 blends with no significant effect on the LTFT performance and/or no significant effect on the ASTM D 2068 performance can also be achieved by using biodiesel that has a filtration time of less than 20 seconds as measured by the modified "Draft" NBB filtration time test using one filter as described herein.

The modified "Draft" filter time test proposed by the NBB was tested by the present inventor, yielding the following results.

Diesel Fuel Dispenser Filter Evaluation

| Fuel | Cloud Point | Temp Range | Biodiesel Properties Total Glycerin wt % | NBB Filter Times Sec.* | Filter Change Out Frequency |
|---|---|---|---|---|---|
| B0 | <−15 F. | >−15 F. | 0 | | Greater than months |
| B2 | <−15 + 2 F. | >0 F. | 0.2 | 215 | Greater than weeks |
| B2 | <−15 + 2 F. | 0 F. to −10 F. | 0.2 | 215 | Less than one day |
| B2 | <−15 + 2 F. | 0 F. and higher | <0.13 | <50 | Greater than weeks |

*Using single 1.6 micron glass filter

The observations were made with biodiesel containing 0.20 wt % total glycerin and meeting all other ASTM D 6751 standards. B100 retain samples with 0.20 wt % total glycerin exhibited significant amounts of whitish deposit after several days in a 48° F. refrigerator. This slow cool separate phase appeared at a temperature above the measured 32° F. cloud point of this B100. Once formed the deposit was difficult to re-dissolve by heating, i.e. redissolved in about an hour at 100° F. B2.5 made with this B100 showed whitish precipitate at temperatures as high as 0° F., when mixed with diesel with a cloud point of −15° F. This B100 showed a filter time of 215 seconds in the modified "Draft" NBB proposed filter time test. This surprising result indicates that biodiesel blends that were well within the acceptable limit of the modified "Draft" NBB proposed filtration test were subject to problems when subjected to conditions that are within expected operating conditions.

Figure 1:
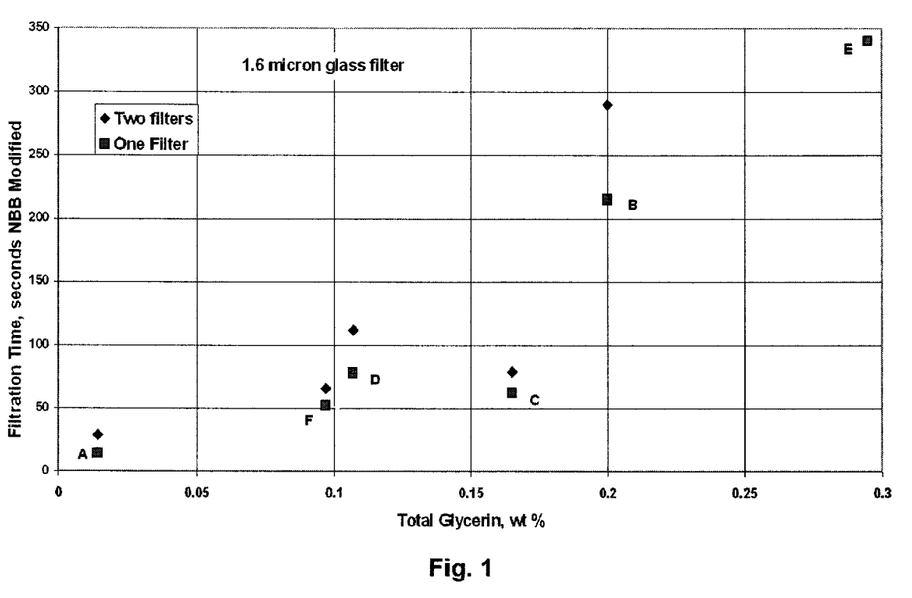
FIG. 1 is a graph presenting data relating total glycerin content in B100 on the filtration time in seconds using the modified "Draft" NBB protocol described herein with different numbers of filters in series. The diamonds represent a filtration time test that includes two filters in series and squares represent filtration through a single filter.
Figure 2:
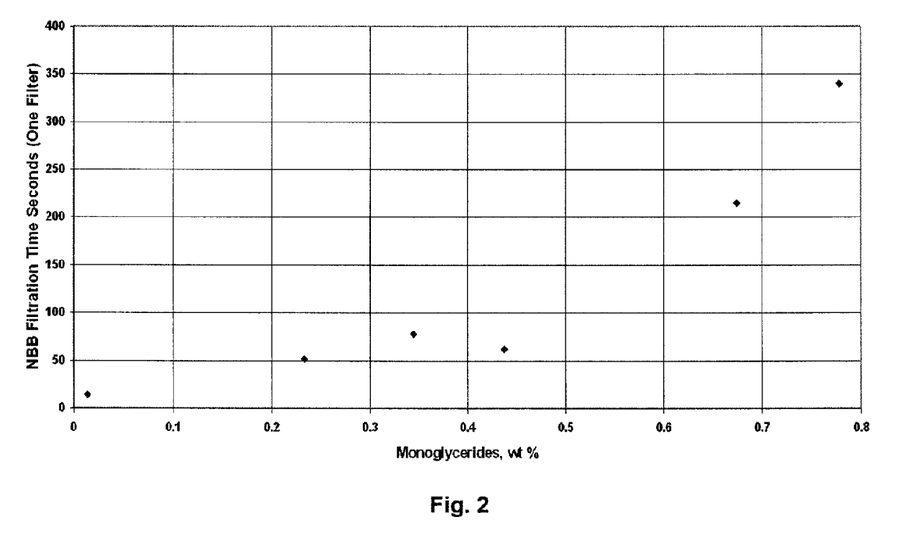
FIG. 2 is a graph presenting data relating total monoglycerides to filtration time through a single 1.6 micron glass filter.

The modified "Draft" NBB filter time protocol was used for further studies. As shown in FIG. 1, the filtration time increases from about 15 to 20 seconds when total glycerin is in the range of about 0.01 wt. % to about 340 seconds at 0.29 wt. % when using one 1.6 micron glass filter. Similar data is obtained when using two filters. FIG. 2 shows the effect of monoglyceride concentration on the filter times under the same conditions. Monoglycerides have a similar effect, and the times rise dramatically at concentrations above 0.45 wt. %.

Figure 3:
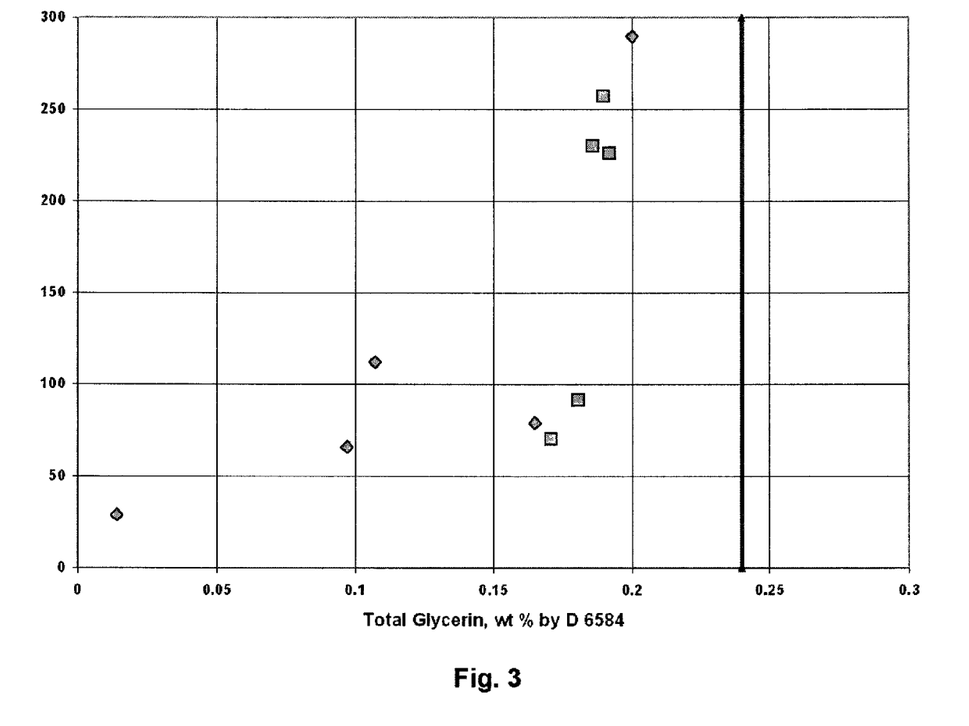
FIG. 3 is a graph presenting data showing the relation of total glycerin measured using the ASTM D 6584 protocol on the filtration time through two 1.6 micron filters. This chart includes data from two different laboratories (squares and diamonds) for different biodiesel sources.

The graph in FIG. 3 is data from two studies of filtration times for biodiesel from different sources. The tested biodiesel compositions varied from about 0.01 wt. % to about 0.20 wt % total glycerin. The data indicates a dramatic reduction in filter time, or what could be characterized as a dramatic improvement in filterability characteristics for the biodiesel as the total glycerin is reduced well below the minimum level of 0.240% recommended by D6751. The vertical line is an indication of the D6751 minimum limit of 0.240 wt. % total glycerin content. These data thus demonstrate that the fuels provided by the present disclosure are far superior to conventional biodiesel fuels that meet all current industry standards.

Figure 4:
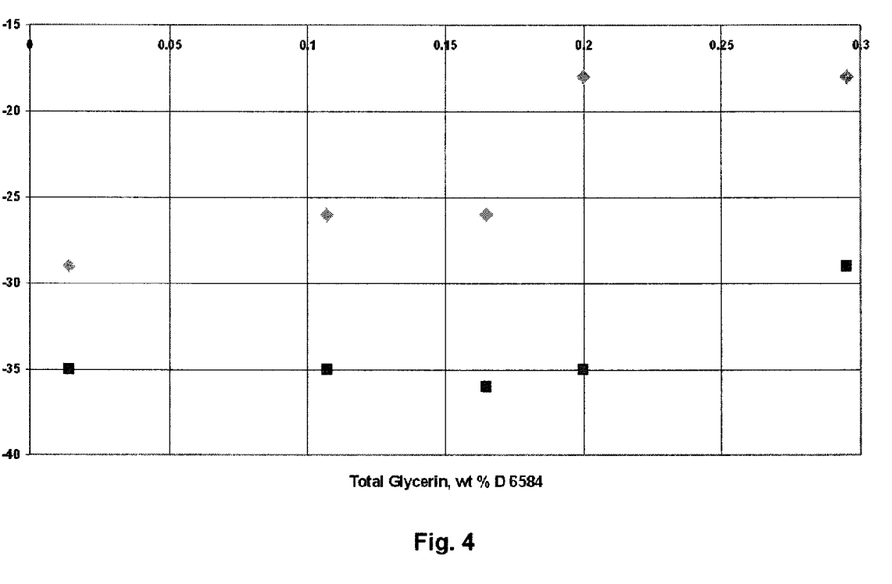
FIG. 4 is a graph presenting data showing the low temperature filtration characteristics of B2.5 blends made with B100 sources with different values of total glycerin. Diamonds indicate data obtained with a 17 micron filter/slow cool protocol (LTFT), and squares indicate data obtained with a 45 micron filter/fast cool protocol (CFPP). The numbers on the X-axis give the total glycerin content of the B100 sources used to make the tested B2.5 blends.

A further study was conducted to study the low temperature performance of B2.5 blends made with a number of B100 biodiesels with varying total glycerin levels. The biodiesels were blended with B0 diesel fuel and a cold flow improver had been added. The cloud point of the base diesel fuel was −17° F. The fuel was subjected to a cold flow test that uses a 17 micron filter in a slow cool test (LTFT), which simulates field conditions, and a test that uses a 45 micron filter with a fast cool (CFPP). The data in FIG. 4 demonstrate that the CFPP test (rectangles) does not detect the poor filterability of biodiesel blends at cold temperatures. For example, using biodiesel with 0.20 wt. % glycerin, this fuel passes the CFPP test down to −35° F., but the same fuel only passes the LTFT test down to around −17 or −18° F. This disparity in results is evident for all the fuels tested in this example. All examples of B2.5 blends show good filter characteristics in the CFPP test at temperatures as low as −35° F. regardless of B100 impurities, except for the sample that was prepared from B100 with about 0.29 wt. % total glycerin, which is above the minimum standard of 0.240%.

Figure 5:
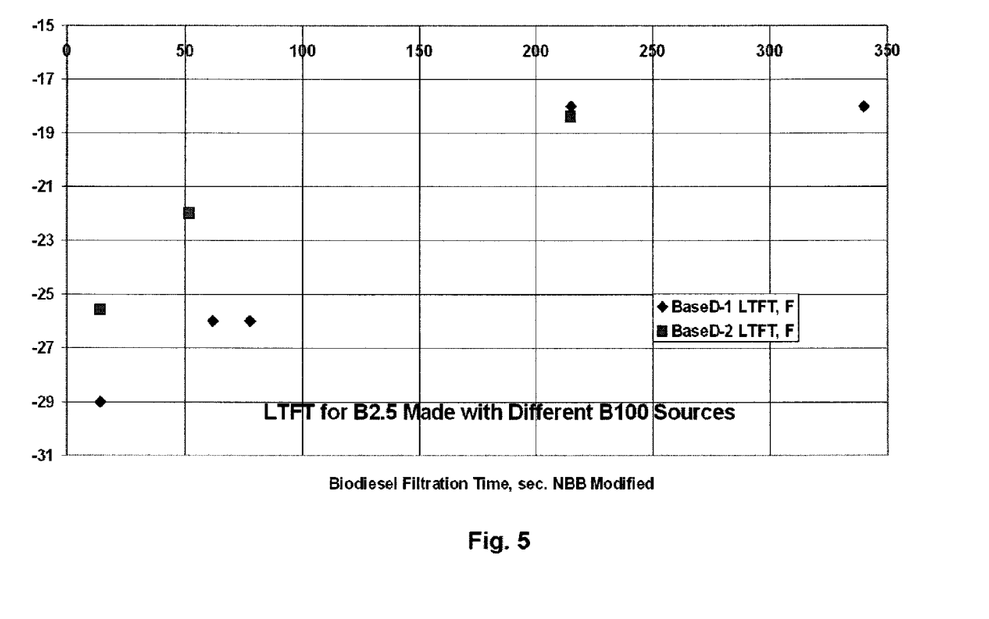
FIG. 5 is a graph presenting data showing the low temperature filtration characteristics of blends made with different B100 sources. The numbers on the X-axis indicate the filtration time of the B100 source used to make the tested B2.5 blends.
Figure 8:
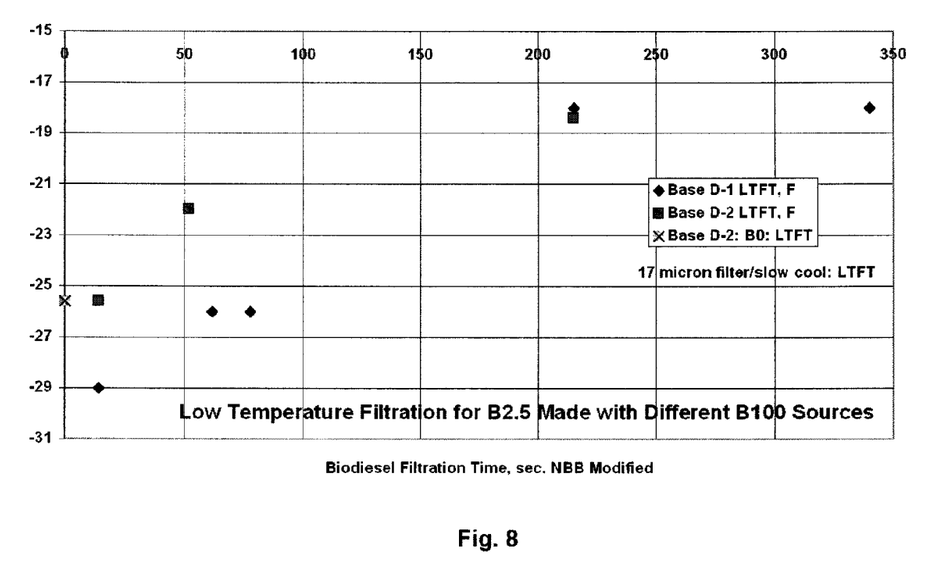
FIG. 8 is a graph presenting data also shown in FIG. 5, with the addition of data for the B0 base fuel indicated with an "X".

A series of B2.5 blends made from different B100 sources were then tested with the LTFT procedure. This test was designed to determine if the B100 source actually does have an effect on the low temperature filter characteristics of a B2.5 blend. The filtration time of the B100 source in the modified "Draft" NBB filter time procedure is indicated across the top of the graph, with B100 filtration times ranging from around 10 seconds up to about 340 seconds for the B100 with the highest contamination level. The data is shown in FIG. 5. If the B100 impurities evidenced by filtration times up to 360 seconds had no effect, as indicated by the prior art, then the data would be essentially a straight horizontal line. The data, however, indicate that the B100 source has a significant effect on the filter characteristics of the B2.5 blend, especially when the B100 exhibits a filter time of less than 200 seconds in the modified "Draft" NBB filter time protocol. This surprising result shows again that the disclosed compositions are superior to the current fuels that meet all industry standards. The tests shown in FIG. 5 also used two sources of base fuel, noted as D-1 and D-2. The data show that both low Cloud Point base diesel fuels show a pronounced elevation of LTFT temperature as the impurity levels increase, even in the range below 0.240 wt. % total glycerin. The data is repeated in FIG. 8, with the addition of the LTFT pass temperature for the D2 B0 base fuel, indicated by an "X." This shows the reproducibility of the subject phenomenon of B100 impurities affecting cold filtration properties.

Figure 6:
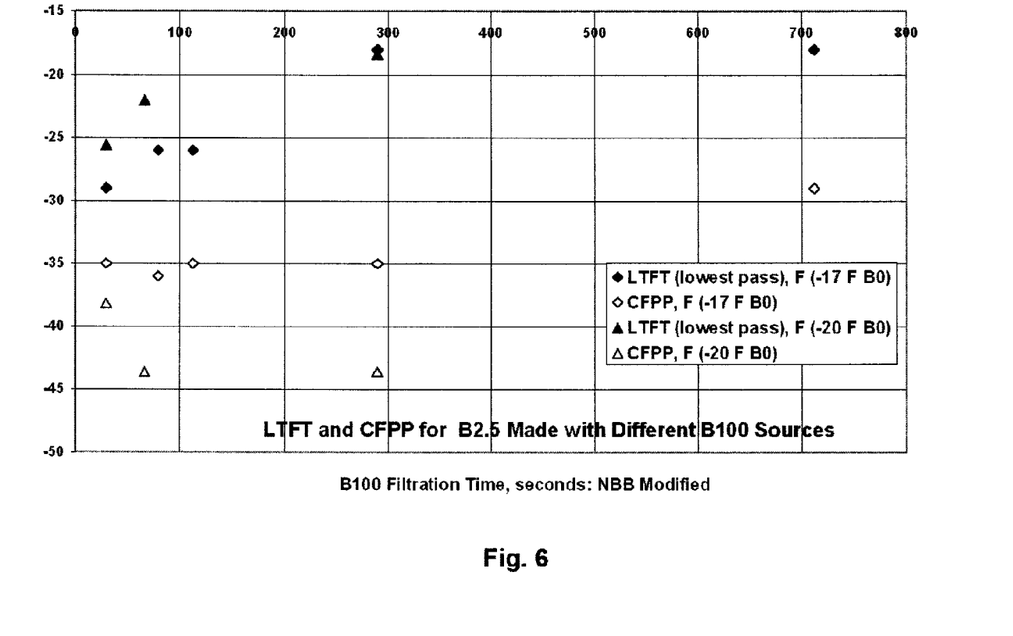
FIG. 6 is a graph presenting data showing the effect of the B100 filter time (using the test described herein) on the corresponding B2.5 blends and using two base diesel fuels. The filled diamonds are data using the LTFT test with a −17° F. Cloud Point B0 base and the open diamonds are results of CFPP tests using the same blends. The filled triangles are data using the LTFT test with a −20° F. Cloud Point B0 base and the open triangles are results of CFPP tests using the same blends.

Another series of tests were conducted with B2.5 blends made with different B100 sources in both the CFPP and LTFT tests. The data is shown in FIG. 6. The data again demonstrate the ineffectiveness of the CFPP test for detecting cold temperature problems in biodiesel fuels. Using a B100 source with a modified "Draft" NBB filter time of over 700 seconds, almost twice the accepted filtration time of 360 seconds, this blend passed the CFPP test down to about −29° F. and in all cases, the CFPP pass temperature was at least 15° F. below the pass temperature for the LTFT test.

Figure 7:
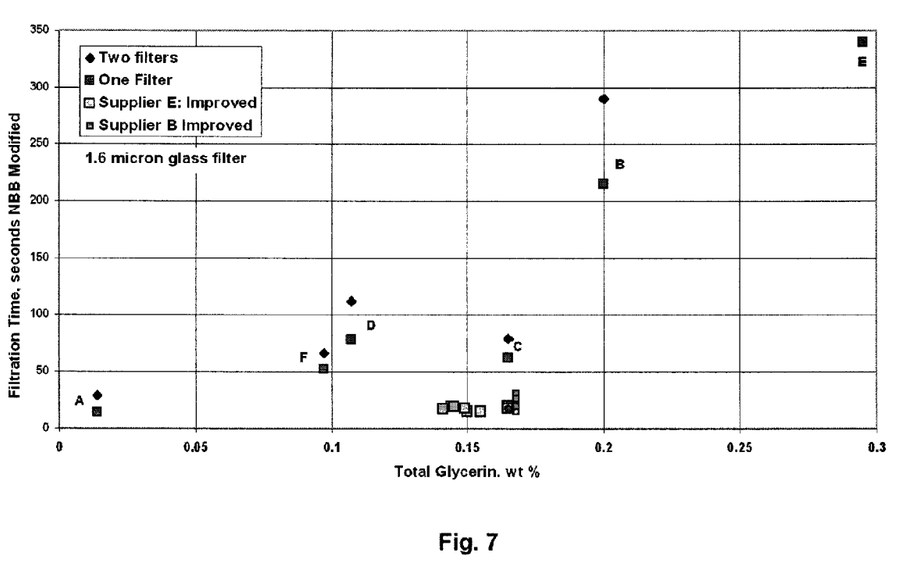
FIG. 7 is a graph presenting data showing the relation of the modified "Draft" NBB filter time protocol described herein to the total glycerin content of different biodiesel samples and sources. The letters represent different biodiesel sources.

The data shown in FIG. 7 provide a demonstration of the need to consider not only total glycerin levels but also improved performance in the modified "Draft" NBB filtration time test, to well below the proposed standard of 360 seconds to predict improved low temperature filtration performance. Improved biodiesel from two suppliers was tested in a low temperature filter test, and both samples showed improved filter characteristics, with a filter time of around 25 seconds.

The total glycerin wt. % of both samples was measured at from about 0.14 to about 0.17%. Problematic impurities can be removed at a greater rate than total glycerin reductions, showing that impurity removal is critical to good filtration performance.

Although reducing total glyceride contaminants from a biodiesel source has been shown to be a surprising improvement to performance of blends made with the biodiesel, even further discoveries described below lead to even further improvements in performance, and particularly low temperature performance.

It was observed that large quantities of precipitates formed in some biodiesel samples left for weeks in a 40° F. refrigerator. Shipping a sample caused the precipitates to dissolve into solution by the time it was received at the inventor's laboratory. When the sample was refrigerated, a large quantity of solids formed. Four additional samples were sent, were received free of solids, and formed large quantities of precipitates when refrigerated.

Figure 9:
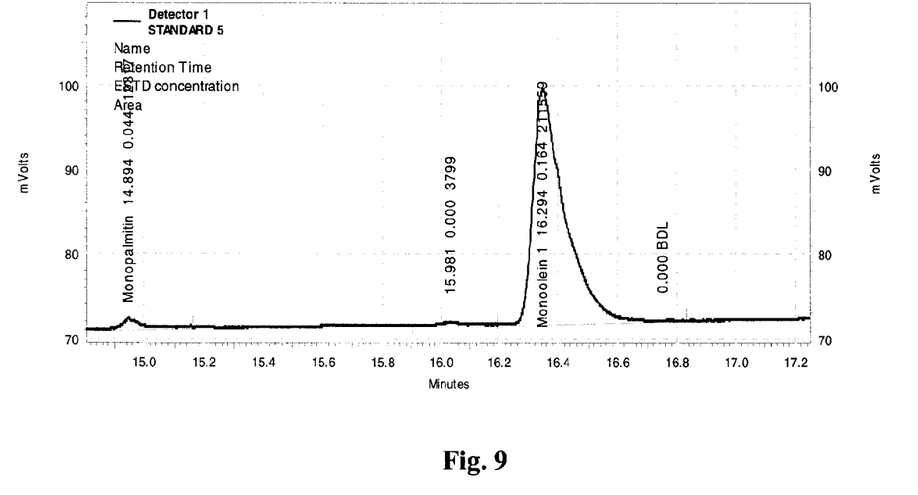
FIG. 9 is a trace of a gas chromatogram of the Supelco monoolein standard used for calibration of the monoglycerides

Studies have identified biodiesel precipitates as including the saturated monoglycerides, monopalmitin and monostearin. The ASTM D 6584-00 method used by FHR to measure glycerides in biodiesel performs a derivitization procedure followed by gas chromatography with internal standards. A Supelco monoolein standard is used for calibration. A chromatogram of the standard is shown in FIG. 9. The standard contains small amounts of monopalmitin and monostearin eluting just after monoolein; the retention times have been confirmed with pure standards.

Figure 10:
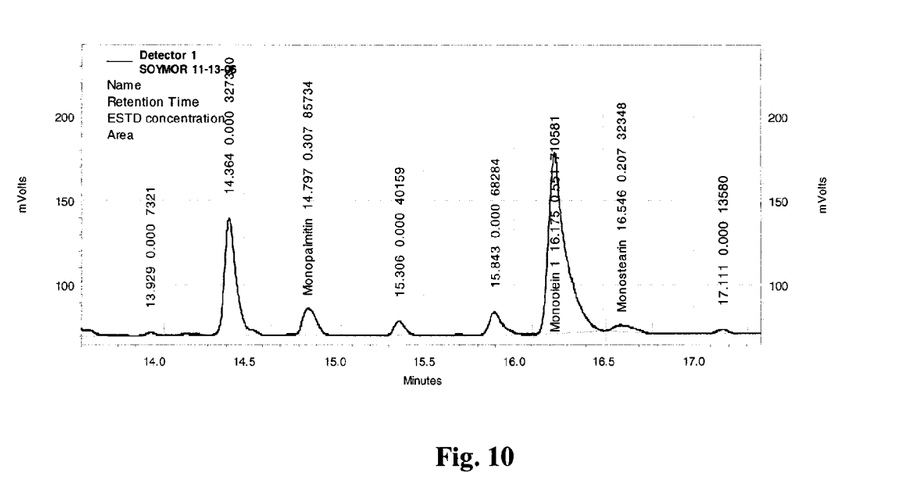
FIG. 10 is a trace of a gas chromatogram of a B100 sample that phase separates at 40° F.

A B100 sample was analyzed as part of the routine monitoring program. The sample used was 0.1179 grams of B-100 which was reacted with MSTFA and then diluted to 8.3 ml with heptane. The chromatogram of the GC analysis showed peaks between 9 and 12 minutes that were the major C16 to C20 methyl ester diesel fuel components. Butanetriol and Tricaprin were internal standards. The same chromatogram expanded is shown in FIG. 10. Monopalmitin, monoolein and monostearin elute between 14.6 and 16.8 minutes. Their quantization is based on the monoolein standard.

Figure 11:
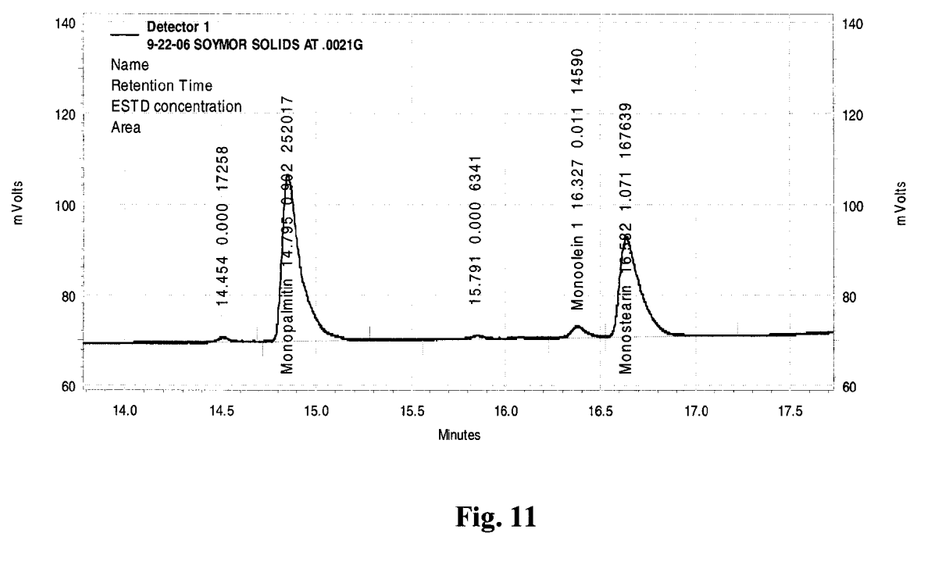
FIG. 11 is a trace of a gas chromatogram of a waxy precipitate from the phase separated B100.

The original sample was removed from the 40° F. refrigerator. The solids were removed from the bottle's bottom with a plastic pipette and filtered cold with a 0.7 micron filter. Filtering was extremely slow and the solids left on the filter were waxy. The solids were scraped off the filter and 0.0021 grams of the solids were dissolved in 0.2 ml of pyridine and 0.2 ml of the internal standards butanetriol and tricaptrin were also dissolved in pyridine. The solution was reacted with MSTFA and diluted to 8.4 ml with heptane. The expanded chromatogram is shown in FIG. 11. The major identified components of the solids are monopalmitin at 9.1% and monostearin at 6.0%. Monoolein is 0.5%. Diglycerides and triglycerides were not detected. The C16 to C20 methyl ester peaks have an area 2.6 times that of the monoglycerides suggesting much of the remaining solids weight is residual methyl esters.

Analysis data from two commercial biodiesel samples indicated the monopalmitin and monostearin in the liquid B-100 averaged 0.067% and 0.028%, respectively. The saturated mono-glycerides, monopalmitin and monostearin, are over a 100 times more concentrated in the precipitate than the original liquid.

Additional analysis was done on two sets of used filters. Each set contained two filters. One filter from each set was cut open and visually inspected. Upon visual inspection both filters were clean with no evidence of large particulate clogging the filters. The filters were soaked in fuel as would be expected. The fuel and particulate were extracted from both filters using acetone. The acetone fuel mixture was filtered to remove any particulate that may have been clogging the filters. The filter from the first set was discolored and contained 0.4 grams of an organic waxy material along with pieces of the filter. The second set sample filtered cleanly and only contained 0.1 grams of filter material.

The acetone was then evaporated off of the fuel. The fuel extracted out of the first filter was 77 grams. The fuel extracted out of the second filter was 69 grams. Once the acetone was evaporated out of the fuel a waxy white precipitate formed. The fuel mixture was heated and the precipitate went into solution. The fuel was transferred into bottles. The bottles were placed into a refrigerator set at 40° F. The samples separated into fuel and white precipitate. The waxy precipitate was then filtered from the fuel. The waxy precipitate comprised approximately 10% of the material extracted from the filter. The waxy material was then analyzed by GC method ASTM D-6584. It was found to contain almost 40% of the following biodiesel components, monopalmitin, 26.4 wt. %, monoolein, 1.0 wt. % and monostearin, 12.8 wt. %. The balance could be hexane that was used to wash the filter cake.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention.

The invention claimed is:

1. A composition comprising a mixture of a B0 base diesel fuel and a B100 methyl ester or ethyl ester biodiesel fuel, wherein the B100 biodiesel fuel contains no more than 0.20 wt. % total glycerin.

2. The composition of claim 1, wherein the B100 biodiesel contains from 0.20 wt. % to 0.01 wt. % total glycerin.

3. The composition of claim 1, wherein the B100 biodiesel contains from 0.15 wt % total glycerin to 0.01 wt % total glycerin.

4. The composition of claim 1, wherein the B100 biodiesel contains from 0.10 wt % total glycerin to 0.01 wt % total glycerin.

5. The composition of claim 1, wherein the B100 biodiesel contains about 0.03 wt % total glycerin.

6. The composition of claim 1, wherein the B100 contains less than about 0.20 wt % monoglycerides.

7. The composition of claim 1, wherein the B100 contains less than 0.04 wt. % monopalmitin.

8. The composition of claim 1, wherein the B100 contains less than 0.02 wt. % monopalmitin.

9. The composition of claim 1, wherein the B100 contains less than about 0.015 wt % monostearin.

10. The composition of claim 1, wherein the B100 contains less than about 0.01 wt % monostearin.

11. The composition of claim 1, wherein the B100 contains less than about 0.04 wt. % monopalmitin and less than about 0.015 wt % monostearin.

12. The composition of claim 1, wherein the mixture is in a ratio of from 50% to 2% biodiesel to diesel.

13. The composition of claim 1, wherein the mixture is a B50, B20, B5, B2.5, or B2 biodiesel blend.

14. The composition of claim 1, wherein the base diesel fuel meets the specifications for ASTM Grade No. 2 D diesel fuel.

15. The composition of claim 1, wherein the base diesel fuel has a cloud point of −14° F. or less.

16. The composition of claim 1, wherein the base diesel fuel has a cloud point of −7° F. or less.

17. The composition of claim 1, further comprising a cold flow improver effective to lower the LTFT temperature lower than the cloud point of the base fuel.

18. A composition comprising a mixture of a B0 base diesel fuel and a B100 methyl ester or ethyl ester biodiesel fuel, wherein the B100 biodiesel fuel has a filtration time of less than 200 seconds when filtered through a single 1.6 micron glass filter under a vacuum of from 21 to 25 inches Hg as follows:
  a sample of the B100 is chilled at 40° C. for 16 hours and allowed to warm to room temperature without heating;
  the sample is shaken for one minute;
  a 300 ml subsample of the B100 sample is transferred to the filter; and
  filtration time for the 300 ml subsample is measured.

19. The composition of claim 18, wherein the B100 biodiesel has a filtration time of less than 100 seconds.

20. The composition of claim 18, wherein the B100 biodiesel has a filtration time of less than 50 seconds.

21. The composition of claim 18, wherein the B100 biodiesel has a filtration time of less than 20 seconds.

22. The composition of claim 18, wherein the B100 biodiesel has a filtration time that is substantially equal to the filtration time of the B0 diesel fuel.

23. The composition of claim 18, wherein the mixture is in a ratio of from 50% to 2% biodiesel to diesel.

24. The composition of claim 18, wherein the mixture is a B50, B20, B5, B2.5, or B2 biodiesel blend.

25. The composition of claim 18, wherein the base diesel fuel meets the specifications for ASTM Grade No. 2 D diesel fuel.

26. The composition of claim 18, wherein the base diesel fuel has a cloud point of −14° F. or less.

27. The composition of claim 18, wherein the base diesel fuel has a cloud point of −7° F. or less.

28. The composition of claim 18, further comprising an amount of cold flow improver effective to lower the LTFT temperature lower than the cloud point of the base fuel.

29. A method of producing a biodiesel blend for use in cold weather conditions comprising blending a B0 diesel fuel with a methyl ester or ethyl ester B100 biodiesel, wherein the highest pass temperature in an LTFT test for the blend is substantially the same as the highest pass temperature for the B0.

30. The method of claim 29, wherein the blend is a B20 blend.

31. The method of claim 29, wherein the blend is a B5 blend.

32. The method of claim 29, wherein the blend is a B2.5 blend.

33. The method of claim 29, wherein the blend is a B2 blend.

34. The method of claim 29, wherein the B100 diesel contains from about 0.20 wt. % to 0.01 wt. % total glycerin.

35. The method of claim 29, wherein the B100 diesel contains less than 0.04 wt. % monopalmitin and less than 0.015 wt % monostearin.

* * * * *